US006250358B1

(12) United States Patent
Lafond

(10) Patent No.: US 6,250,358 B1
(45) **Date of Patent: *Jun. 26, 2001**

(54) APPARATUS AND METHOD FOR SEALING THE CORNERS OF INSULATED GLASS ASSEMBLIES

(76) Inventor: Luc Lafond, 23 Woodvalley Dr., Etobicoke, Ontario M9A 4H4 (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/259,416

(22) Filed: Feb. 25, 1999

Related U.S. Application Data

(63) Continuation-in-part of application No. 08/872,998, filed on Jun. 11, 1997, now Pat. No. 5,876,554.

(30) Foreign Application Priority Data

Jun. 10, 1998 (WO) .................................. PCT/CA98/00563

(51) Int. Cl.[7] .................................................... C03C 27/10

(52) U.S. Cl. .......................... 156/500; 156/107; 156/109; 156/244.22; 156/578

(58) Field of Search .................................... 156/500, 578, 156/107, 109, 244.22, 535; 118/100, 101, 120; 425/218

(56) References Cited

U.S. PATENT DOCUMENTS

| | | | |
|---|---|---|---|
| 3,947,311 | 3/1976 | Jarchow et al. | 156/357 |
| 4,088,522 | 5/1978 | Mercier et al. | 156/107 |
| 4,110,148 | 8/1978 | Rocholl | 156/359 |
| 4,145,237 | 3/1979 | Mercier et al. | 156/107 |
| 4,205,104 | 5/1980 | Chenel | 428/34 |
| 4,234,372 | 11/1980 | Bernhard et al. | 156/356 |
| 4,260,347 * | 4/1981 | Sawatzki et al. | 425/123 |
| 4,561,929 | 12/1985 | Lenhardt | 156/522 |
| 4,711,692 | 12/1987 | Lisec | 156/486 |
| 4,743,336 | 5/1988 | White | 156/522 |
| 4,759,810 | 7/1988 | Jackson et al. | 156/64 |
| 4,780,164 | 10/1988 | Rueckheim et al. | 156/104 |
| 4,826,547 | 5/1989 | Lenhardt | 156/109 |
| 5,650,029 | 7/1997 | Lafond | 156/107 |
| 5,762,738 | 6/1998 | Lafond | 156/107 |

* cited by examiner

*Primary Examiner*—Geoffrey L. Knable
(74) *Attorney, Agent, or Firm*—McFadden, Finchan

(57) ABSTRACT

The present invention relates to an apparatus and method for injecting sealant material into the corners of an insulated glass assembly suitable for use in manual and automated production. It has been found that significant saving in both time and material can be achieved by only sealing the corners of the assembly, particularly using the automated method and apparatus. The apparatus includes a pair of wiper blocks each having a surface for abutting an edge of a glass assembly arranged in substantially perpendicular configuration to each other, adapted for converging and diverging reciprocal movement from an adjoining position for molding a square corner to a separated position for wiping smooth the surface for the injected sealant material. A nozzle is positioned between the wiper blocks for injecting sealant material into the corner area and retracting in concert with the converging movement of the wiper blocks. The method according to the present invention includes confining a corner area to be filled with sealant material, injecting sealant material into the corner area, molding the injected sealant into a substantially square corner, and wiping smooth the surface of the injected sealant.

17 Claims, 8 Drawing Sheets

APPARATUS AND METHOD FOR SEALING THE CORNERS OF INSULATED GLASS ASSEMBLIES

This application is a continuation-in-part of application Ser. No. 08/872,998 filed Jun. 11, 1997, now U.S. Pat. No. 5,876,554.

FIELD OF THE INVENTION

The present invention relates to an apparatus and method for sealing the corners of insulated glass assemblies, in particular the invention relates to an apparatus and method suitable for use in manual and automated production.

BACKGROUND OF THE INVENTION

Insulated windows comprise an assembly of multiple substrates (generally glass) in a spaced apart configuration with air or other insulating gas sealed in the void between the substrates. If the seal is broken, moisture can enter the assembly which condenses on the glass and clouds the window and also reduces its insulating properties.

A spacer around the periphery of the substrates maintains the substrates in the spaced apart configuration. Commonly a sealant material is applied around the perimeter of the assembly in the channel between the edges of the substrates and the spacer material to prevent the seal from breaking due to separation of the substrate from the spacer and to prevent penetration of moisture through the spacer. Examples of devices for sealing an assembly perimeter are shown in U.S. Pat. No. 4,826,547 issued to Lenhardt, and in a previous application to the present inventor under U.S. Ser. No. 08/694,666.

Some spacers, particularly those including polybutylene, or other butyl materials, or combinations of multiple sealant materials, particularly including polymeric materials such as polysilicones, EDPM, and polyurethanes, have been found to have excellent sealing properties in contact with the inner surfaces of the substrates without an additional layer of sealant material.

At the corners, however, the sealing and moisture barrier properties are reduced. Ends of the spacer are generally joined at the corners. In other cases the spacer is bent or folded to form a corner. It is preferred to cut or notch the spacer partially to form a square folded corner without bulging or wrinkling. At the cut, notch, or join additional sealant is preferably applied to maintain the integrity of the seal. For the greatest efficiently the sealant material must join with the spacer to form an airtight seal with the glass surfaces and the spacer material. Thermoplastic materials such as butyl materials are commonly used. In a preferred assembly the spacer and sealant are selected to be compatible to form a chemical bond between them. Since the entire perimeter of the glass assembly will not be filled with sealant material, the spacer can advantageously be placed dose to the edges of the assembly. The shallow channel between the spacer and the edge is used to spread sealant material in a smooth layer from the corner area. Significant savings in both time and material can be achieved if only the corners are to be sealed, particularly using an automated method and apparatus.

SUMMARY OF THE INVENTION

Accordingly, the present invention comprises an apparatus for injecting sealant material into a corner of a glass assembly having at least two spaced substrates with a spacer there between, the apparatus having support means for supporting the glass assembly comprising:

- a pair of cooperating wiper blocks each for abutting an edge of the glass assembly at a corner thereof, said blocks being mounted in angular relationship relative to each other,
- nozzle means for injecting sealant material into a corner of a glass assembly arranged between the wiper blocks and adapted to retract from a corner of the glass assembly, and
- actuation means for effecting relative reciprocal movement between said nozzle means and said corner of said glass assembly, and for effecting movement of said blocks from a first position for permitting injection of sealant material into a corner of said glass assembly, and a second position removed from said first position.

In an alternate embodiment, the wiper blocks may move in a reciprocating converging and diverging movement, or in a tandem movement. Further, securing means may retain the glass assembly in position and positioning means may position the corner of the assembly between the wiper blocks for the corner filling and wiping operation.

In an alternate embodiment, the present invention comprises an apparatus for injecting sealant material into a corner of a glass assembly including at least two substrates having corners aligned in spaced apart configuration by a spacer joining the peripheries of the substrates comprising:

- support means for supporting the glass assembly in the apparatus;
- positioning means for locating the corner of a glass assembly in the apparatus;
- securing means for maintaining the glass assembly in position in the apparatus;
- a cooperating pair of wiper blocks each having a surface for abutting an edge of the glass assembly arranged in angular configuration to each other, adapted for converging and diverging reciprocal movement from a first adjoining position for molding the injected sealant material into a substantially square corner, to a second separated position for wiping smooth the surface of the injected sealant material; and
- nozzle means for injecting sealant material into a corner of a glass assembly arranged between the wiper blocks and adapted to retract from the corner of the glass assembly in concert with the converging movement of the wiper blocks.

In an alternate embodiment, the present invention comprises an automated sealant injection station for sealing the corners of a glass assembly comprising:

- a corner sealing station having means for sealing at least one corner of a trailing end of a first glass assembly located in a leading position at said station and means for sealing at least one corner of a leading end of a second glass assembly located in a trailing position, relative to said first glass assembly, at said station,
- means for advancing a glass assembly into and out of said leading position of said corner sealing station and into and out of said trailing position of said corner sealing station,
- multiple injection heads comprising a first pair of cooperating wiper blocks adapted for sealing at least one corner of the trailing edge of said glass assembly when said first glass assembly is in the leading position of said corner sealing station and a second pair of cooperating wiper blocks adapted for sealing at least one corner of the leading edge of said second glass assembly when said second glass assembly is in the trailing position at said corner sealing station, positioning means for locating a corner of each glass assembly;

securing means for maintaining each of said first and second glass assemblies in position;

said wiper blocks each having a surface for abutting an edge of the glass assembly and each pair of wiper blocks being mounted in angular relationship relative to each other; and nozzle means associated with each pair of cooperating wiper blocks for injecting sealant material into a corner of a glass assembly arranged between the wiper blocks, said nozzle means being retractable from a corner of the glass assembly, and actuation means for effecting relative reciprocal movement between each of said nozzle means and a respective corner of said glass assembly, and for effecting movement of said blocks from a first position for permitting injection of sealant material into a corner of said glass assembly, and a second position removed from said first position.

In an alternate embodiment, the present invention comprises an automated sealant injection station for sealing the corners of a glass assembly comprising:

conveyor means for advancing a glass assembly into and out of the injection station;

multiple injection heads comprising:

positioning means for locating the corner of a glass assembly in the apparatus;

securing means for maintaining the glass assembly in position in the apparatus;

a cooperating pair of wiper blocks each having a surface for abutting an edge of the glass assembly arranged in angular configuration to each other, adapted for converging and diverging reciprocal movement from a first adjoining position for molding the injected sealant material into a substantially square corner, to a second separated position for wiping smooth the surface of the injected sealant material; and nozzle means for injecting sealant material into a corner of a glass assembly arranged between the wiper blocks and adapted to retract from the corner of the glass assembly in concert with the converging movement of the wiper blocks, wherein each injection head is adapted to receive a corner of an assembly for sealing, and to retract to allow the assembly to pass through the station once the sealing operation is complete.

In a preferred embodiment the invention further provides an automated sealant injection station for sealing the corners of a glass assembly as described above including two cooperating injection heads each injection head including means for rotatable positioning from a first position for receiving two leading corners of the assembly to a second position for receiving two trailing corners of the assembly.

In another aspect, the present invention comprises a method of sealing the corners of a glass assembly including at least two substrates having corners aligned in spaced apart configuration by a spacer joining the peripheries of the substrates, wherein the spacer includes a partial or complete or discontinuity at the corner, including a slit or notch removed from the corner. The method comprises the steps of:

positioning a corner of the glass assembly for sealing;

confining a corner area of the glass assembly between the spacer and the corner of the glass assembly to be filled with sealant material;

injecting sealant material into the corner area;

closing the corner of the assembly including the injected sealant material and molding the injected sealant material into a substantially square corner; and wiping surfaces of the injected sealant smooth.

In another aspect, the present invention comprises a method of sealing the corners of a glass assembly including at least two substrates having corners aligned in spaced apart configuration by a spacer joining the peripheries of the substrates comprising the initial steps of positioning a corner of the glass assembly for sealing comprising:

confining a corner area of the glass assembly between the spacer and the corner of the glass assembly to be filled with sealant material;

injecting sealant material into the corner area;

closing the corner of the assembly including the injected sealant material and molding the injected sealant material into a substantially square corner; and wiping surfaces of the injected sealant smooth.

It is particularly advantageous to apply sealant according to a method which enables the sealant to be bonded to the polymeric material of the spacer and to provide an apparatus which applies a bonding seal.

The invention will be more clearly understood as described with reference to the following figures, which illustrate a preferred embodiment of the present invention, in which:

Having thus described the invention, reference will now be made to the accompanying drawings illustrating preferred embodiments.

BRIEF DESCRIPTION OF THE DRAWINGS

Like numerals are used throughout to designate like elements.

DETAILED DESCRIPTION OF THE DRAWINGS

Figure 3A:
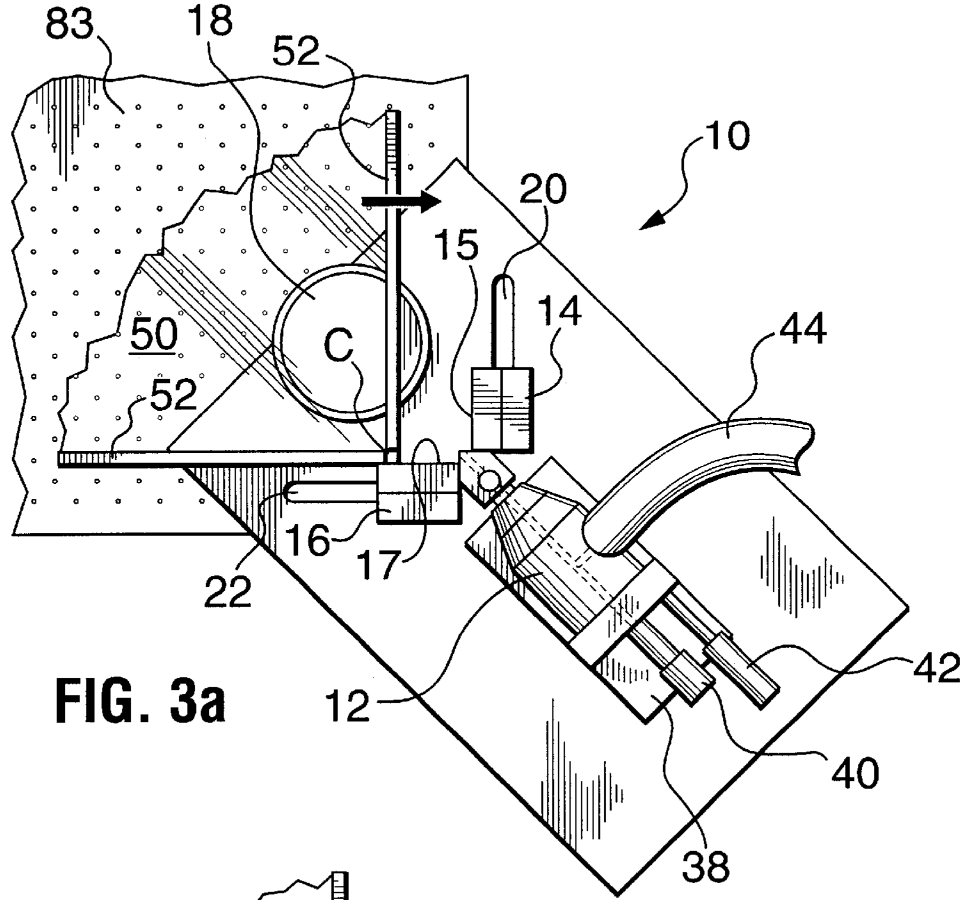
FIGS. 3*a–e* illustrate the operation sequence of the injection head in detail.
Figure 3B:
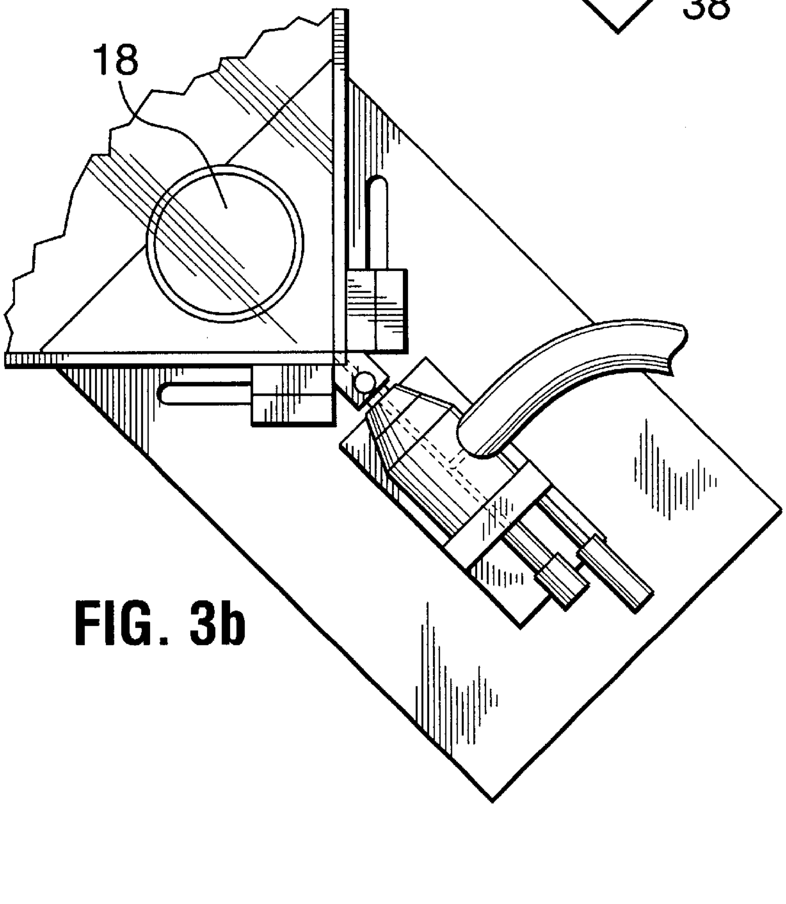
Figure 3C:
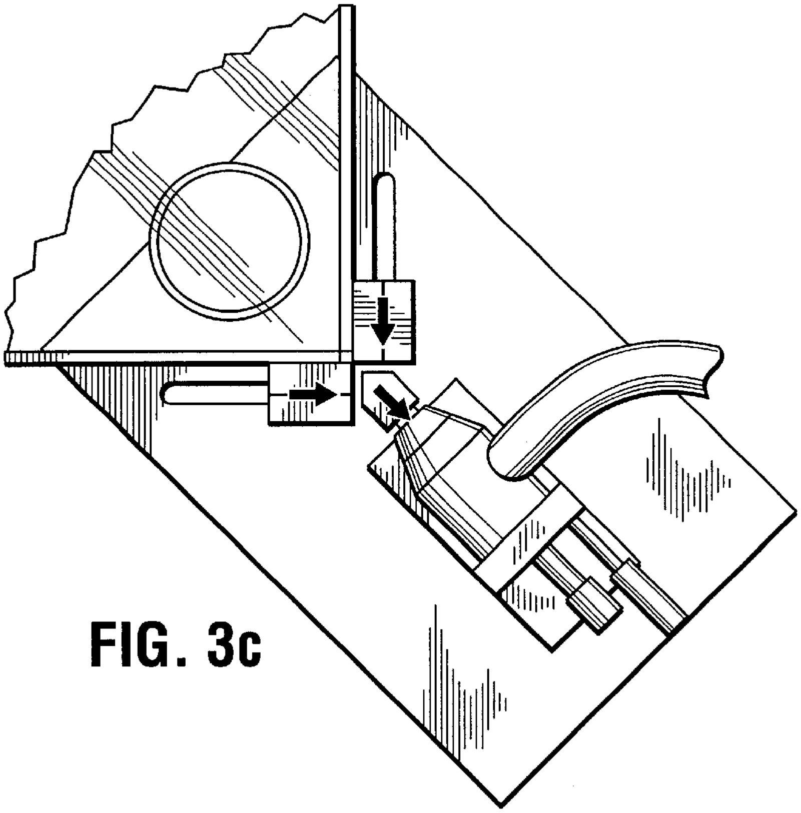
Figure 3D:
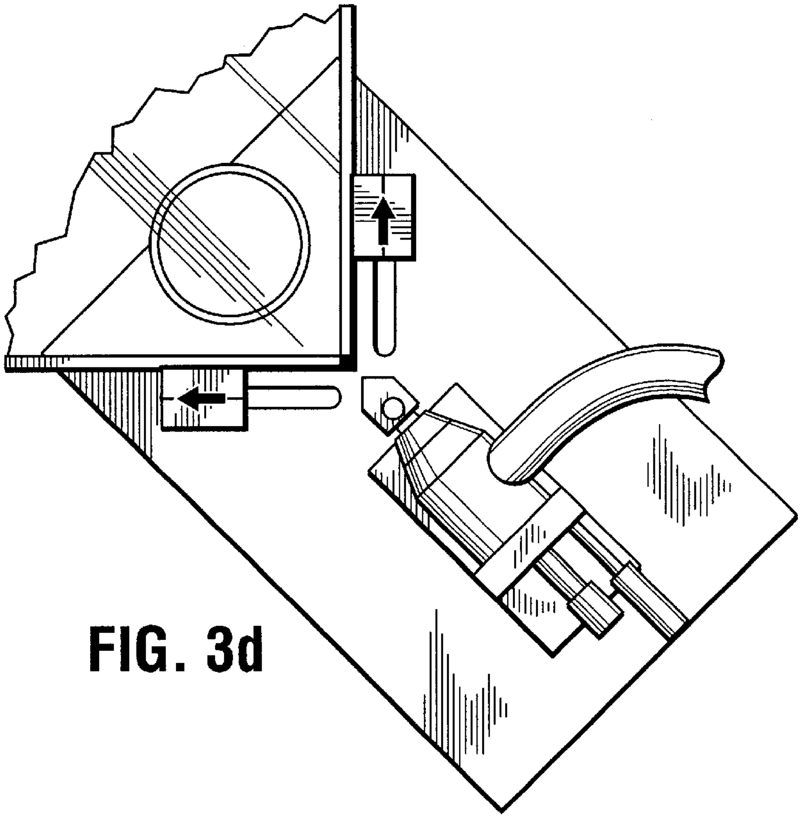
Figure 3E:
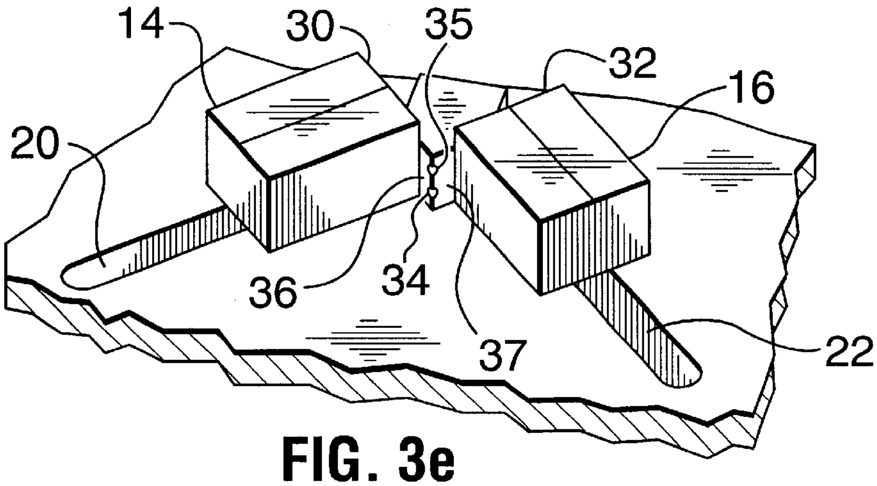
Figure 4A:
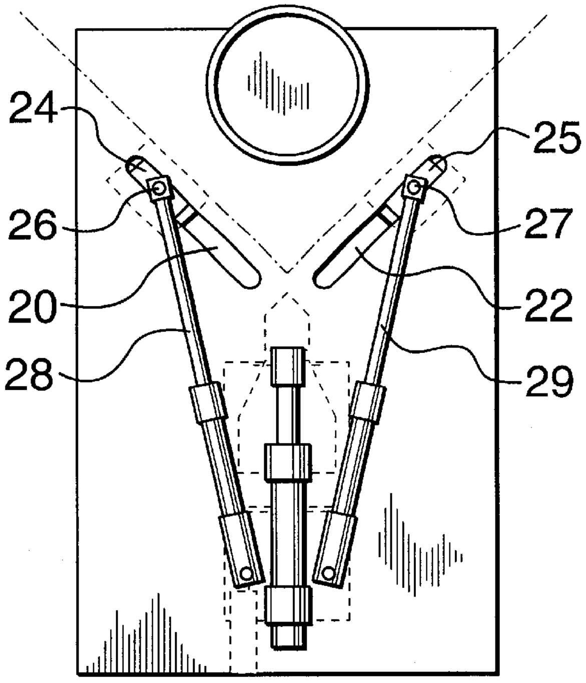
FIGS. 4*a–b* show the mechanical linkages operating the injection head of FIG. 3 in fully extended and fully retracted positions.
Figure 4B:
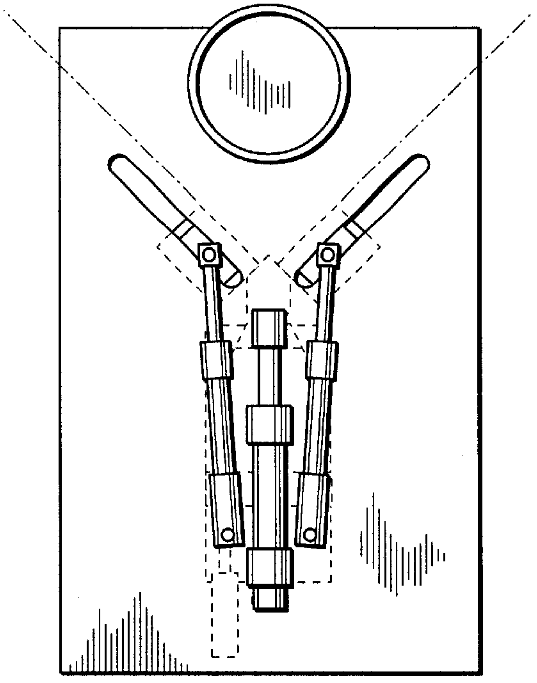
Figure 5:
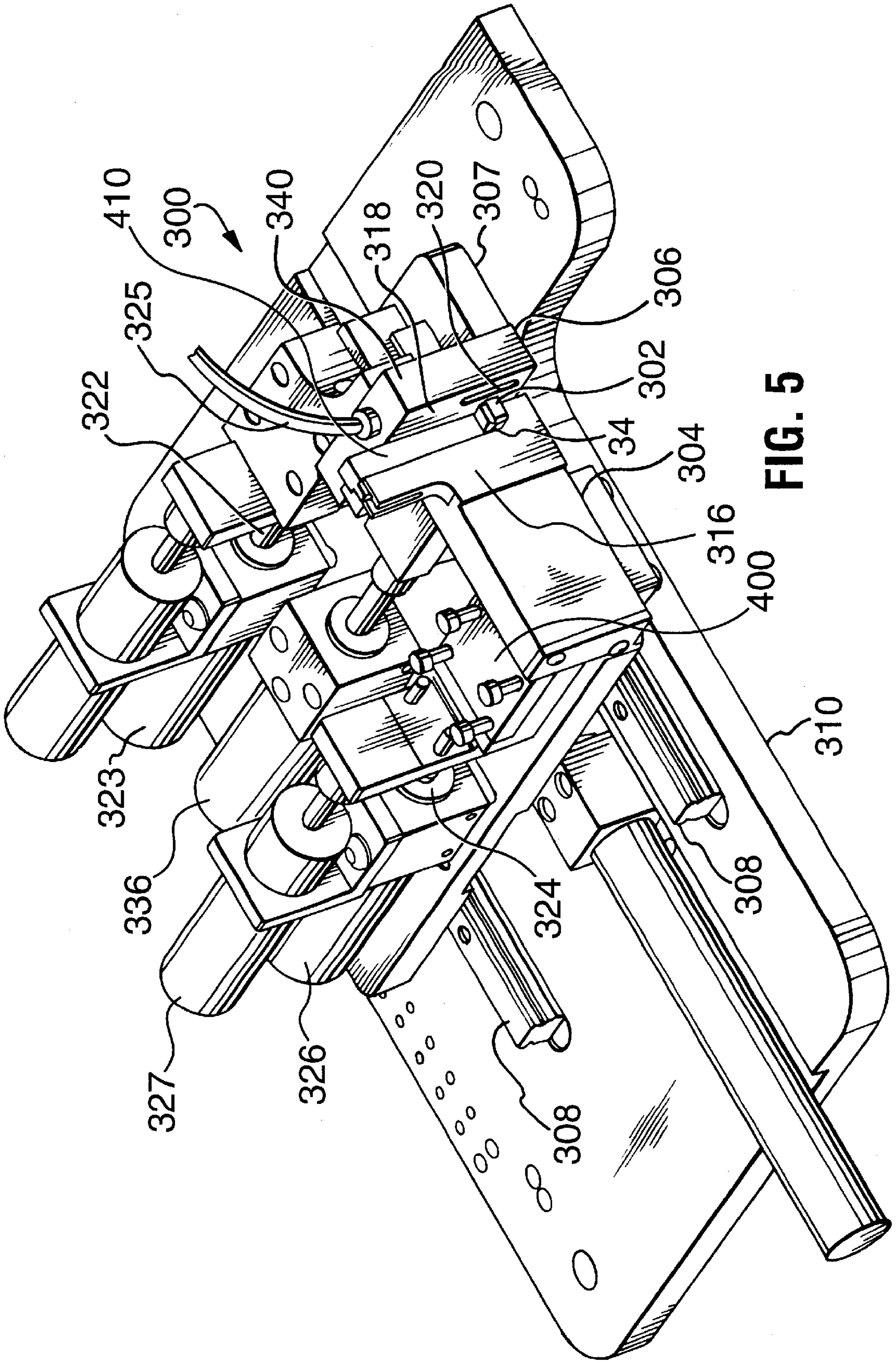
FIG. 5 is an isometric view of another embodiment of the injection head according to the present invention.

The injection head shown in detail in FIGS. 3 and 4 is designated generally at 10. The head includes a nozzle means, comprising a retractable nozzle 12 and a cooperating pair of wiper blocks 14, 16 arranged in a planar configuration aligned with the glass assembly 50 to be sealed. The injection head 10 is supported on an appropriate support means, conveniently a conventional glass handling structure, namely a caster or float table in a manual assembly line or with automated conveyors in an automated line. Associated with the injection head 10 is a suction cup 18 or other equivalent securing means for securing the glass assembly 50 during the sealing operation. If the spacer 52 is spaced inwardly from the edge of the assembly 50, leaving a deeper channel to be filled with sealant, the blocks are provided with a profile to fit into the channel to confine the corner area while sealant is injected. A typical corner known in the art is indicted as C in FIG. 3*a*.

The wiper blocks 14,16 are arranged in a perpendicular configuration for receiving the corner of a glass assembly 50 comprising at least two substrates having corners aligned in spaced apart configuration by a spacer 52 joining the peripheries of the substrates. The wiper blocks may also serve a dual function as positioning means for locating a corner of the glass assembly. In particular, the interior surface 15, 17 of each wiper 14, 16 serves as a guide to position the glass assembly 50. The interior surfaces 15, 17 which contact the sealant material are preferably faced with TEFLON™ or other non-stick material and are preferably heated to form a smooth surface on the sealant material.

The wiper blocks (14, 16) are arranged in angular configuration to each other for abutment of the interior surfaces 15, 17 with corresponding edges of the glass assembly. The wiper blocks are adapted for converging and diverging reciprocal movement from a home position seen in FIG. 3*a*, to a first adjoining position, seen in FIG. 3*c*, for molding the injected sealant, and then to a second separated position, seen in FIG. 3*d*, for wiping smooth the surface of the injected sealant material. For use with a conventional rectangular glass assembly, the wiper blocks diverge at 90°.

The blocks 14, 16 are adapted to move reciprocally in slots 20, 22 or similar guides. Movement is coordinated to move simultaneously in converging or diverging directions. As shown the blocks 14,16 are positioned above slots 20, 22. Shoes 24, 25 are each attached to the blocks 14, 16 to limit movement to a linear path. As seen in FIG. 4*a*, the shoes 24, 25 are each pivotally attached by a pin or ball joint 26, 27 to a pneumatic cylinder 26, 27 which actuates the reciprocal movement. At the converged position (shown in FIG. 3*c*) the blocks 14, 16 meet edge 30 to edge 32 to completely close the corner as shown in FIG. 3*c* of the glass assembly 50 for molding a square corner of the applied sealant.

Hot melted butyl, a common sealant, is very tacky, and prone to forming strings and hairs as one surface is separated from another. In order to prevent this problem, the edges 30, 32 of the blocks 14, 16 which meet also serve to wipe the nozzle 12 as they converge and the nozzle 12 is withdrawn, as seen in FIG. 3*c*. This motion draws any excess sealant material into the corner area where it is smoothed into the shallow channel between the substrates and the spacer.

The nozzle 12 has an orifice 34 for injecting sealant into the corner area. Internally a conventional needle valve is provided to open and close the orifice 34 and to adjustably regulate the flow of sealant. A timing sequence is used to control the volume of sealant injected but such a sequence is optional. An alternative would be to use a metered or pre-metered system. Adjacent the orifice 34 the nozzle 12 has side surfaces 36, 37 adjacent the path of the edges 30, 32 of the wiper blocks 14, 16. The nozzle side surfaces 36, 37 and the block edges 30, 32 cooperate to wipe excess sealant from the nozzle 12 into the molded corner or smoothed into the shallow channels in the edges of the glass assembly. The nozzle 12 is supported on a slider 38 which is connected to a pneumatic cylinder 40 to actuate reciprocal movement. An adjustable hydraulic check cylinder 42 is also secured to the slider 38 to control the rate of nozzle movement.

For use with a thermoplastic sealant material, such as hot melted butyl, all elements of the nozzle 12 and feed 44 through which the sealant passes are heated to allow the sealant to flow. The heated nozzle 12 advantageously can be used to heat the adjacent spacer material 52 to improve the bond between sealant and spacer. An additional heat means, comprises a heat source 35, such as a hot air jet or light source for heating and curing bonding material, is advantageously associated with the nozzle 12 adjacent the orifice 34.

In operation a glass assembly 50 is advanced to the injection head 10 until it abuts a first wiper surface 17, and then transversely until it abuts the second wiper surface 15. Once the glass assembly 50 is in position, the suction cup 18 is activated to secure it in position. The wiper blocks 14, 16 are originally positioned in an angular configuration adjoining nozzle 12, which is in the forward position in place to inject sealant, as shown in FIG. 3*d*. The nozzle 12 pauses, heating the spacer material 52. In this configuration the corner area C to be sealed is confined by the wiper blocks 14, 16. The nozzle 12 injects sealant material while retracting at a constant speed until the valve stops the flow. The blocks 14, 16 converge to an adjoining position to mold a square corner, as shown in FIG. 3*c*. Any excess sealant is wiped from the side surfaces 36, 37 of the nozzle 12 into the corner. In this position sealant is molded by the wiper blocks 14, 16 into a substantially square corner. The wiper blocks 14, 16 then diverge simultaneously to the position shown in FIG. 3*d*, wiping and smoothing the sealant material into the shallow channel in the edges of the assembly. The injection is made under pressure to insure good fill and sealing contact with the glass assembly 50. Some excess sealant material is applied as a result. This excess is used to form a smooth join between the sealant and the edge of the glass assembly 50. The operation finished, the glass assembly 50 is released by the suction cup 18 and removed from the injection head 10, and the nozzle 12 then returns to the forward position ready for the next application. The sequence of operations is preferably regulated by a central controller.

FIG. 3*e* shows the wiper blocks in the angular position of FIG. 3*b*.

The invention includes means for repositioning the injection head relative to the glass assembly for finishing a subsequent corner. In one version, the injection head 10 may be adapted to be used with a manual assembly operation on a caster or float table 58. The glass assembly 50 is positioned manually in the injection head 10. Once the operation is finished the glass assembly 50 is removed manually and rotated to seal the next corner.

Figure 1:
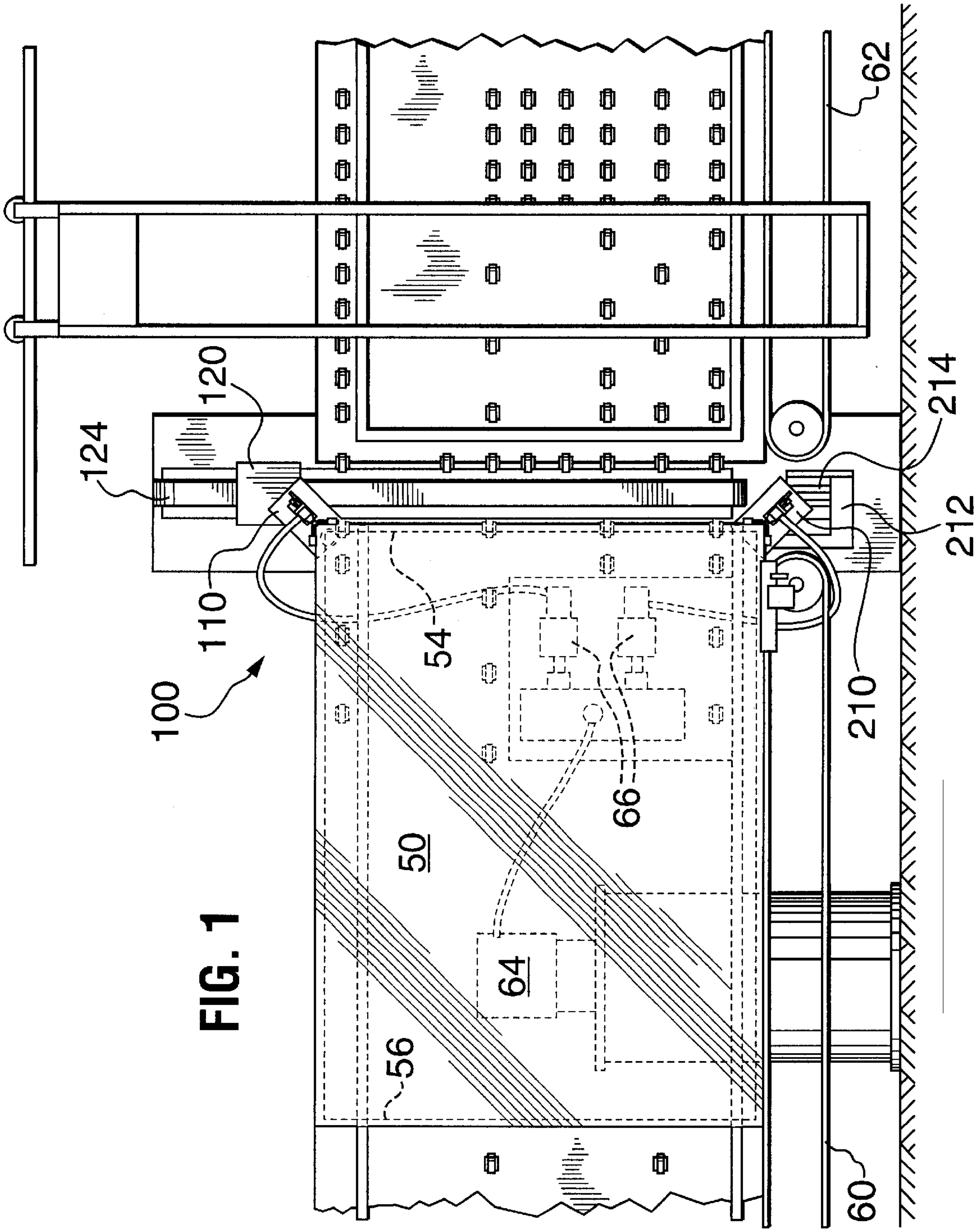
FIG. 1 illustrates an automated sealant injection station according to the present invention, suitable for an automated production line.
Figure 2A:
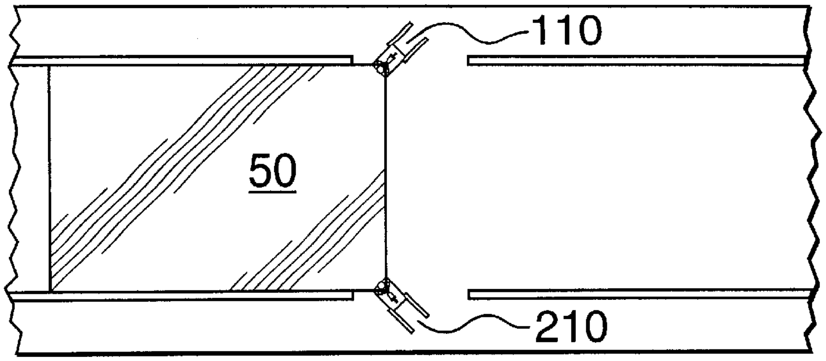
FIGS. 2*a–d* illustrate schematically a sequence of operations in the automated station of FIG. 1.
Figure 2B:
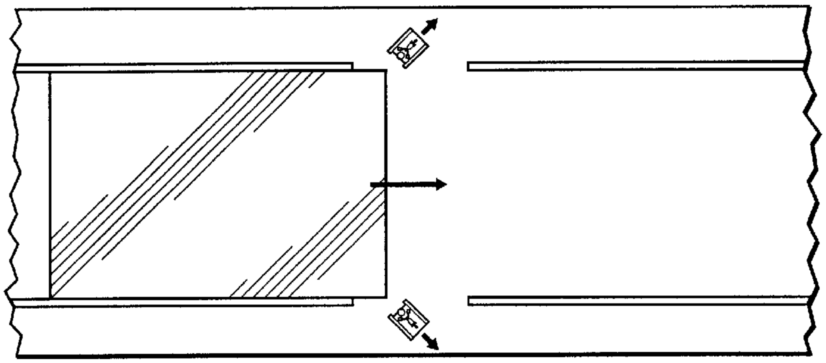
Figure 2C:
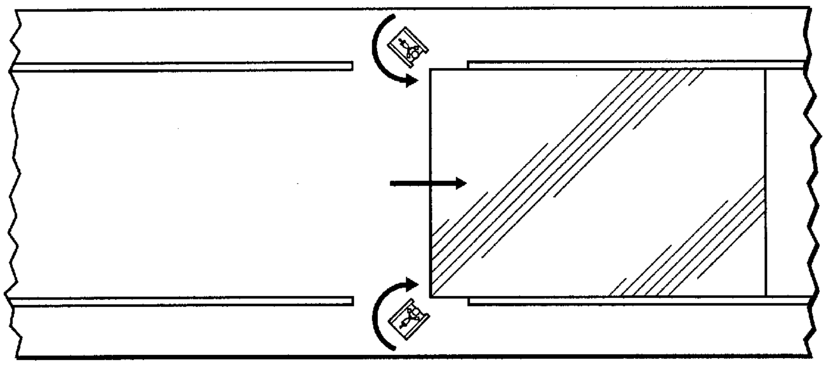
Figure 2D:
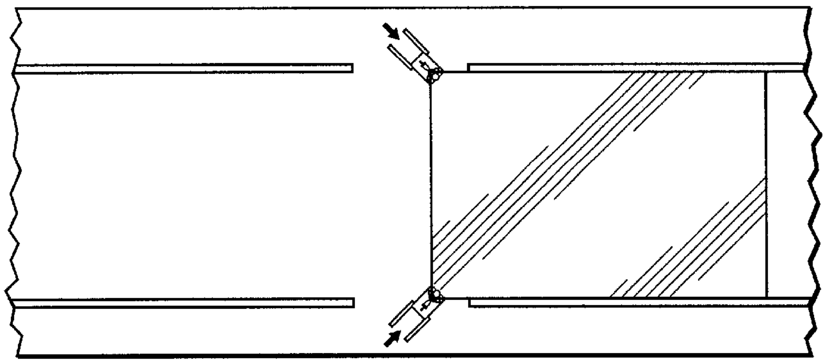
Figure 2E:
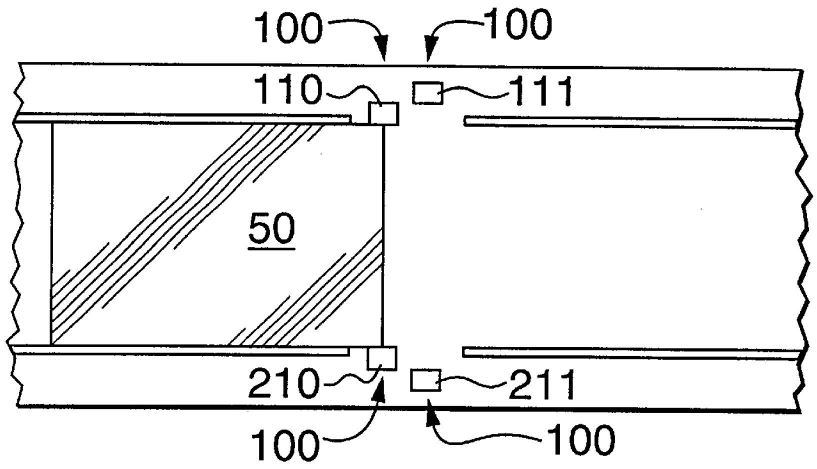
Figure 2F:
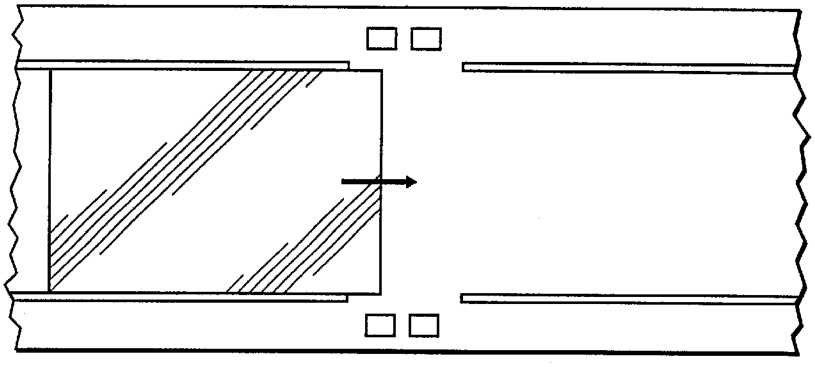
Figure 2G:
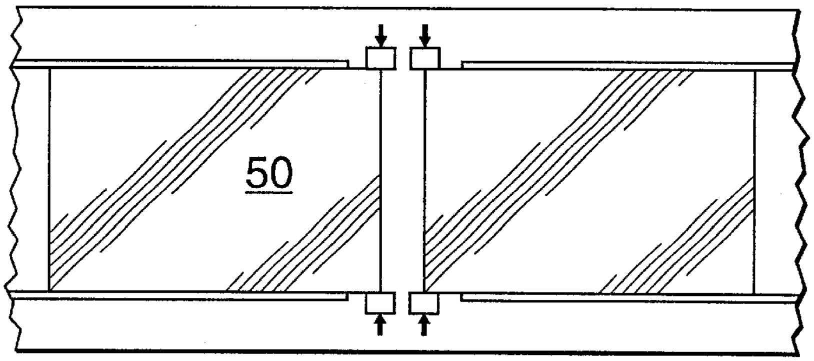
Figure 2H:
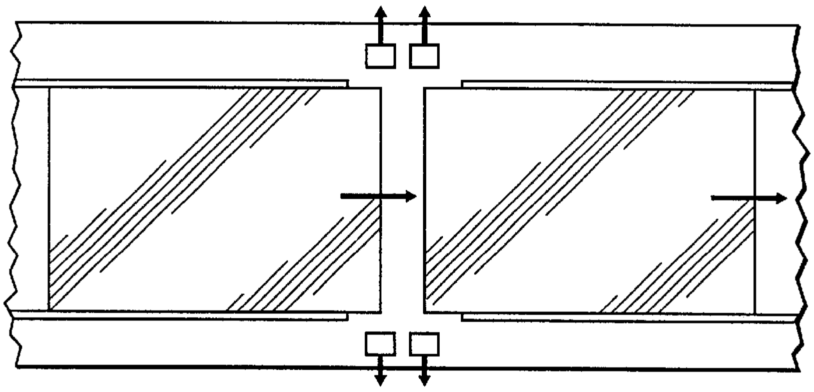

Alternatively, the injection head 10 may be rotatably mounted on a transverse beam (not shown) for transverse movement across a glass assembly 50 providing a degree of automated positioning. Such a configuration would permit two corners of a glass assembly 50 to be sealed before the glass is rotated for sealing the opposite corners As shown in FIG. 1, the invention is shown in an assembly for automated sealant application suitable for use in an automated assembly line. In a preferred embodiment the glass assembly 50 is transported in a vertical arrangement, however, the apparatus and its operation are substantially the same for a horizontally oriented device. A pair of conveyors 60, 62 are provided for advancing the glass assembly 50 to a sealing station 100 having an upper 110 and a lower cooperating injection head 210. A feed source 64 supplies sealant material through metering pumps 66 to each injection head 110,210. Each injection head is adapted to receive a corner of the glass assembly for sealing, and to retract to allow the assembly to pass through the station once the sealing operation is complete.

The lower injection head 210 is supported on support arm 212 of the frame by pneumatic cylinders 214 for raising the injection head 210 into position, and lowering it to allow the glass assembly 50 to pass through the sealing station 100. The upper injection head 110 is mounted on a vertical traveller 120 driven by a servo motor on an endless belt 124 for adjustment to the height for different sizes of glass assemblies 50. The servo motor also raises the injection head 110 to allow the glass assembly 50 to pass through the sealing station 100. Both application heads 110, 210 are rotatably supported on pivots which can be actuated by pneumatic cylinders, indexing cylinders, or the like, for positioning in a first position at substantially 45° to the vertical leading edge 54 of the glass assembly 50 for receiving the two leading corners of the glass assembly 50, to a second position 90° from the first position at substantially 45° to the vertical trailing edge 56 of the glass assembly 50 for receiving the two trailing corners of the glass assembly 50. These two positions allow each injection head 110, 210 to inject sealant into the corners of the leading edge 54 of the glass assembly 50, rotate and inject sealant into the corners of the trailing edge 56 of the glass assembly 50 once it is advanced into the injection station, as seen in FIGS. 2*a–d*.

In operation the automated station 100 receives a glass assembly 50 on the conveyor 60 and advances it to the position as shown in FIG. 1. The upper and lower injection heads 110, 210 are positioned to receive the leading corners of the glass assembly 50. As discussed above the glass assembly 50 abuts the surface 17 of the first wiper block 16 and advances until it is in position abutting the surface 15 of the second wiper block 14. A securing means comprising a suction cup 18 or appropriate mechanism releasably secures the glass assembly 50 in position. The wiper blocks 14, 16 comprise positioning means and confine the corner area. The nozzle means 12 heats the spacer material 52, and then injects sealant into the corner area once the wiper blocks 14, 16 are in position. The nozzle 12 retracts in concert with cooperating pair of wiper blocks 14, 16 as the latter converge to close and mold a square corner simultaneously wiping the side surfaces 36, 37 of the nozzle 12. The wiper blocks 14, 16 diverge and wipe smooth the surface of the injected sealant.

The wiper blocks 14, 16 are arranged in angular configuration to each other for abutment of the interior surfaces 15, 17 with corresponding edges of the glass assembly. The wiper blocks are adapted for converging and diverging reciprocal movement from a home position seen in FIG. 3*a* to a first adjoining position, seen in FIG. 3*c*, for molding the injected sealant, and then to a second separated position, seen in FIG. 3*e*, for wiping smooth the surface of the injected sealant material. For use with a conventional rectangular glass assembly, the wiper blocks diverge at 90°.

The upper injection head 110 is raised out of the path of the glass assembly 50, and the lower injection head 210 is lowered by the pneumatic cylinders 214 out of the path of the glass assembly 50. The glass assembly 50 is released and advanced on the conveyors 60, 62. As the glass assembly 50 advances on the conveyors 60, 62 it trips a location sensor which stops the glass assembly 50 in position for sealing the trailing corners. The injection heads 110, 210 rotate 90° from the first position to the second position for sealing the corners of the trailing edge 56 of the glass assembly 50. The upper injection head 110 is lowered and the lower injection head 210 is raised into position with the wipers 14, 16 abutting the edges of each corner. The glass assembly 50 can be placed precisely by the conveyors, or the conveyors can reverse direction to place the trailing corners against the wiper blocks 14, 16 as for the leading corners.

The sequence begins again injecting sealant into the corners. The glass assembly 50 is released and transferred out of the sealing station, and the injection heads 110, 210 are rotated back into position to receive the next glass assembly. The sequence of operation is preferably regulated by a central controller. Location sensors can be used to trigger the operations synchronously with the progress of the glass assembly.

Referring to FIGS. 5 & 6*a–f*, in another embodiment of the invention, the injection head indicated generally at 300 includes a retractable nozzle means, including a nozzle 302 and a pair of wiper blocks 304 and 306 mounted on platform 307 which is mounted by rails 308 on a support platform 310 for movement of the injection head 300 relative to the glass assembly 50 to be sealed. Member 410 is slidably mounted by tongue and groove between the wiper blocks 304 and 306. The bottom of the member 410 abutts the top of nozzle 302 and prevents sealant from entering the gap between the blocks 304 and 306. To change nozzle 302 and to accommodate different nozzle sizes, member 410 is slidingly removed to permit the nozzle 302 to be replaced. The support platform 310 is mounted on an appropriate support means as previously described with respect to injection head 10. Associated with injection head 300 is a suction cup 18 as previously described.

The wiper blocks 304,306 are arranged in perpendicular configuration for receiving the corner of a glass assembly 50. The wiper blocks 304,306 may also serve as positioning means for locating a corner C of the glass assembly 50 and the interior surface and profile of the wiper blocks 304,306 are substantially the same as for blocks 14,16. A slot 320 is provided in the wiper 306 through which excess sealant material is drawn from the corner C being molded and then through an orifice (not shown) in the wiper 306 to tubing means 325 by suitable suction means after injection of sealant in the corner C. The removal of excess sealant in this manner, while not necessary, facilitates the injection of the desired amount of sealant into the corner being sealed without the danger of overfilling and the need for precise volumetric metering of sealant material. Removal of excess sealant in this manner may also be employed with injection head 10. The removal of excess sealant in this manner is optional and a conventional metering or premetering system for the sealant may be employed instead.

The block 306 is slidably mounted on the platform 307 for reciprocal movement relative to block 304 which is fixed on the platform 307. The block 306 is connected to piston 322 which is connected to pneumatic cylinder 323 by conventional means and which actuates the reciprocal movement. When block 306 is in the extended position (shown in FIG. 6*b*), the blocks 306 and 308 completely close the corner C of the glass assembly 50 for molding a square corner of the applied sealant.

The nozzle 302 is shaped to fit into the corner of the glass assembly to be sealed and has an orifice 34, internal needle valve activated by cylinder 336 and a timing sequence as previously described with respect to nozzle 12, to inject a volume of sealant into the corner area. Hydraulic check cylinder 327 controls the rate of nozzle 302 movement. The nozzle 302 is connected to piston 324 which is connected to a pneumatic cylinder 326 by conventional means to actuate reciprocal movement of nozzle 302 in an axis parallel to the axis of reciprocal movement of the block 306. A slider bearing 400 holds nozzle 302 and cylinder 336 by means of a plate (not shown) mounted on the slider bearing 400.

Figure 6A:
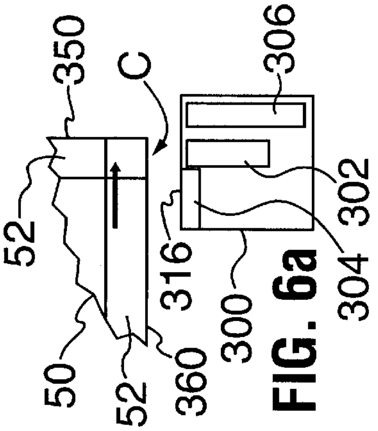
FIGS. 6*a–j* illustrate the operation sequence of the injection head of FIG. 5.
Figure 6B:
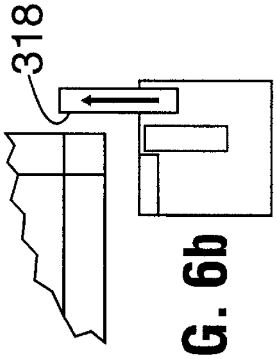
Figure 6C:
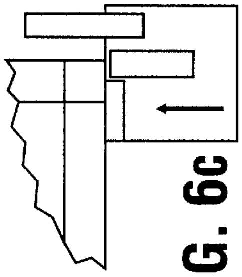
Figure 6D:
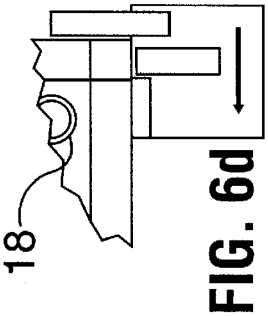
Figure 6E:
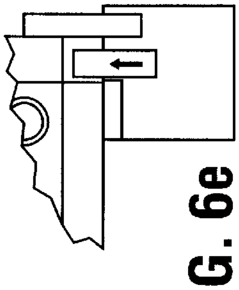
Figure 6F:
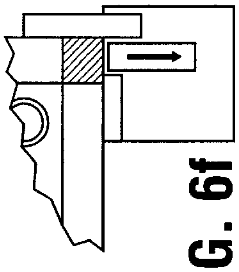
Figure 6G:
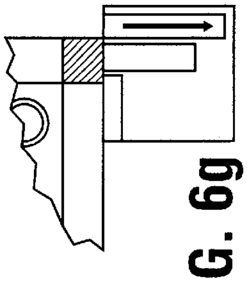
Figure 6H:
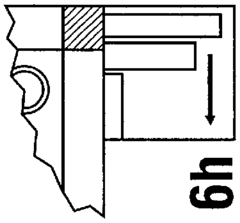
Figure 6I:
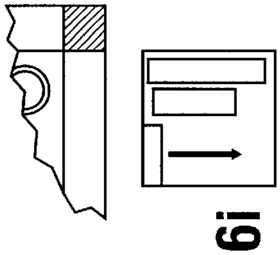
Figure 6J:
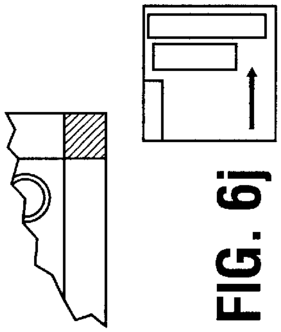

In operation, the wiper block 306 is advanced from a retracted home position (shown in FIG. 6*a*) to an extended position (shown in FIG. 6*b*). A glass assembly 50 is advanced to the injection head 300 until it abuts the wiper interior surface 318 of wiper block 306, and then transversely until it abuts interior surface 316 of wiper block 304. Once the glass assembly 50 is in position, the suction cup 18 is activated to secure it in position and the nozzle 302 is extended into the corner C (shown in FIG. 6*e*). Sealant material is then injected into the corner C as previously described with respect to nozzle 12. Any excess sealant is drawn off through slot 320. Nozzle 302 then retracts until the end of the nozzle 302 is flush with the interior surface 316 of the wiper block 304. Wiper block 306 then retracts until its end surface 340 is flush with the interior surface 316 of block 304. The retracting action of the block 306 wipes and smooths sealant material into the shallow channel in the edges of the assembly 50 and draws the sealant material toward the corner C. The head 300 then moves along the rails 308 along the lateral edge of the glass assembly 50 with the surfaces 316,340 wiping and smoothing sealant material into the shallow channel in the lateral edge of the assembly 50. The wiping and smoothing actions along first the transverse 350 and then the lateral 360 edges of the glass assembly 50 ensure good fill and sealing contact with the glass assembly while preventing the forming of strings and hairs on the sealed edges of the glass assembly 50.

The injection head 300 may be adapted to be used with a manual assembly operation as previously described with injection head 10.

Advantageously as shown in FIGS. 2*e*–2*h*, two sealing stations 100 each including two cooperating injection heads 110,210 and 111,211 respectively can be arranged sequentially in an automated assembly. A first injection station is provided to seal the leading corners of a glass assembly 50 which is then advanced to a second station which seals the trailing corners while a second glass assembly 50 is advanced to the first injection station 100. This permits two assemblies to be sealed substantially simultaneously and eliminates the need to rotate and reposition the injection heads. Suitable actuation means are provided to position the injection heads 110, 210 and 111, 211 with respect to the glass assembly.

Various systems using the injection heads described herein maybe employed for sealing corners; such systems will include suitable positioning and timing components, such as sensors, in order to actuate the injection heads of the present invention. It is also known in the art to measure the width and dept of the particular corner to be sealed by sensors that are associated with the sealing nozzle and then control the injection head as a function of the measured values to adapt to the size of the glass assembly.

What is claimed is:

1. An apparatus for injecting sealant material into a corner of an insulated glass assembly having at least two spaced apart substrates with a spacer therebetween, comprising:

support means for supporting the glass assembly;

nozzle means for injecting sealant material;

a pair of cooperating wiper blocks each for abutting an edge of the glass assembly at a corner thereof and smoothing sealant material against said spacer, said blocks being mounted in angular relationship relative to each other;

first actuation means to effect a reciprocating movement of said nozzle means between a first position adjacent to said corner for injection of said sealant, and a second, retracted position;

second actuation means to effect reciprocating movement of said wiper blocks between a first position wherein said blocks are adjacent to each other and said corner said glass assembly, at which position said blocks and said nozzle means cooperate to form a confined space for injection of said sealant, and a second displaced position, wherein said sealant is smoothed along two sides of said glass assembly by said blocks as said blocks are moved between said first and second positions.

2. An apparatus as defined in claim 1, wherein said apparatus includes means for repositioning said blocks and said nozzle means from said second position to said first position.

3. An apparatus as defined in claim 1, wherein said apparatus includes securing means (18) for maintaining the glass assembly in corner sealing position.

4. An apparatus as defined in claim 1, wherein said wiper blocks are arranged for locating a corner of a glass assembly and positioning a corner abutting said wiper blocks.

5. An apparatus as defined in claim 1, wherein said blocks are mounted in an angular configuration of approximately 90°.

6. An apparatus as defined in claim 1, wherein at least one of the wiper blocks includes heating means.

7. An apparatus as defined in claim 1, wherein each of the wiper blocks has a profile adapted to cooperate with a channel formed by side edges of said substrates and spacer material interiorly of said side edges of said assembly.

8. An apparatus as defined in claim 1, wherein the nozzle has side surfaces (36, 37) to abut each wiper block.

9. An apparatus as defined in claim 1, wherein the nozzle is provided with heating means (35) for heating adjacent spacer material and substrates.

10. An automated sealant injection station for sealing the corners of a glass assembly comprising:

a corner sealing station having means for sealing at least one corner of a trailing end of a first glass assembly located in a leading position at said station and means for sealing at least one corner of a leading end of a second glass assembly located in a trailing position, relative to said first glass assembly, at said station, means (60, 62) for advancing a glass assembly into and out of said leading position of said corner sealing station and into and out of said trailing position of said corner sealing station, multiple injection heads each comprising, an apparatus as defined in claim 1;

securing means (18) for maintaining said glass assembly in position.

11. An automated sealant injection as defined in claim 10, including two cooperating injection heads, associated with each of a leading position of said station and a trailing position of said station, said injection heads including means for rotatable positioning of said heads from a first position for receiving two corners of a glass assembly to a second position for receiving two different corners of a glass assembly.

12. An apparatus as defined in claim 11, wherein at least one injection head is moveable to adapt the sealant injection station to the size of the glass assembly.

13. An apparatus as defined in claim 12, further including means adapted to permit controlled movement of at least one injection head.

14. An apparatus as defined in claim 1, including:

securing means (18) for maintaining the glass assembly in position;

said wiper blocks and nozzle means being mounted to a platform member moveable relative to said glass assembly;

actuation means for moving said platform member relative to said glass assembly;

said wiper blocks (304, 306) each having a surface (316, 318) for abutting an edge of the glass assembly when arranged in angular configuration to each other, a first of said wiper blocks being adapted for converging and diverging reciprocal movement relative to said platform member from a first adjoining position for molding the injected sealant material into a substantially square corner, to a second separated position for wiping smooth the surface of the injected sealant material;

a second of said blocks being fixed relative to said platform member;

said nozzle means (12) being operative for injecting sealant material into a corner of a glass assembly arranged adjacent the wiper blocks and adapted to retract from the corner of the glass assembly in concert with the reciprocal movement of the first wiper block.

15. An apparatus as defined in claim 1, wherein said wiper blocks are adapted to wipe clean said nozzle of excess sealant following said injection.

16. An apparatus as defined in claim 15, wherein said nozzle comprises a nozzle head having two sides arranged at a 90° angle to each other, and said wiper blocks are arranged at a 90° angle, wherein said wiper blocks are arranged to each slide along a corresponding face of said nozzle means to wipe clean said face.

17. An apparatus as defined in claim 10, wherein at least one of the injection heads is moveable to adapt the sealant injection station to the size of the glass assembly.

* * * * *